(12) United States Patent
Parker

(10) Patent No.: US 7,715,373 B1
(45) Date of Patent: May 11, 2010

(54) IP TELEPHONY WITH USER LOCALIZATION FOR CALL CONTROL MANAGEMENT

(75) Inventor: Benjamin J. Parker, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 350 days.

(21) Appl. No.: 11/986,874

(22) Filed: Nov. 27, 2007

Related U.S. Application Data

(63) Continuation-in-part of application No. 10/608,261, filed on Jun. 27, 2003, now Pat. No. 7,356,307.

(51) Int. Cl.
 *H04L 12/66* (2006.01)
(52) U.S. Cl. ..................... 370/352; 455/41.2
(58) Field of Classification Search .................. 370/352; 455/41.2
 See application file for complete search history.

(56) References Cited

U.S. PATENT DOCUMENTS 6,374,302 B1 * 4/2002 Galasso et al. .............. 709/238
2002/0029258 A1 * 3/2002 Mousseau et al. ........... 709/218
2002/0085516 A1 * 7/2002 Bridgelall ................... 370/329
2003/0224795 A1 * 12/2003 Wilhoite et al. ............. 455/445

\* cited by examiner

*Primary Examiner*—Creighton Smith

(57) ABSTRACT

Fixed station equipment automatically determines whether a telephony user is in close proximity to the station and then automatically adopts a profile that properly directs calls according to whether the user is "in-office" or is "away." Call controls are automatically set corresponding to predetermined profiles of the user, and the station includes a computing device and a fixed telephone outlet. It is detected whether a short range, mobile transmitter corresponding to the user is within a predetermined distance of the station. When the transmitter is within the predetermined distance, then a near-station profile is adopted for the user, wherein the near-station profile directs calls within the IP telephony system to the fixed telephone outlet. When the transmitter is not within the predetermined distance, then an away profile is adopted for the user, wherein the away profile directs at least some calls within the IP telephony system to the user via a wireless communication system.

7 Claims, 5 Drawing Sheets

IP TELEPHONY WITH USER LOCALIZATION FOR CALL CONTROL MANAGEMENT

CROSS REFERENCE TO RELATED APPLICATIONS

This application claims priority as a division of U.S. application Ser. No. 10/608,261, filed Jun. 27, 2003 now U.S. Pat. No. 7,356,307.

STATEMENT REGARDING FEDERALLY SPONSORED RESEARCH

Not Applicable.

BACKGROUND OF THE INVENTION

The present invention relates in general to call management in Internet Protocol (IP) telephony, and, more specifically, to automatically switching between various call profiles according to the presence or absence of a user at a certain location.

Telephony services that had been circuit based (e.g., over the Public Switched Telephone Network, or PSTN) are increasingly being transported over packet-based IP networks or combinations of packet-based and circuit-based networks. Benefits of IP telephony include increased efficiency of transport resources, lower system deployment and operation costs, easier system modifications (e.g., added or modified phone numbers), and opportunities for providing improved user features. Enterprises (e.g., businesses, educational institutions, and governmental organizations) can obtain IP telephony network services using private, internally operated network infrastructure (e.g., an IP PBX solution) or can outsource the IP telephony infrastructure to an outside provider (e.g., an IP Centrex solution).

In IP Centrex or IP PBX systems, call management is typically performed using one or more servers (e.g., an IP telephony application server) for controlling call set up, routing, tear down, and other signaling functions. Each user of the system who is capable of receiving a call has at least one corresponding profile stored in the server so that an incoming call to the user may be properly directed within the packet network. Certain aspects of a profile may be customizable by the user so that the destination of incoming calls can be modified. For example, the user has been able to access a web portal on the IP application server using a web browser to modify how various incoming calls are directed. A fixed telephone installation on the enterprise network could be specified or calls could be directed (or redirected when there is a no answer or a busy condition) to an alternate destination such as a specific telephone number or a voice mail server to allow the calling party to record a message. A user profile can also specify special handling of calls from certain calling parties (e.g., family members or co-workers) which may be determined using automatic number identification or caller ID functions as known in the art, whereby these calls may be forwarded to a mobile telephone number while other callers are directed to voice mail, for example.

A telephone service user typically has a primary station where they maintain a fixed telephone instrument that is used during their times of normal availability for telephone calls. In a work setting, for example, this primary station may be a desk in an individual or shared office or may be a rotating workstation in certain workplaces such as a hospital ward. When the user is at their primary station then they typically desire that all their calls be routed to a fixed telephone outlet at the station, such as a desk phone. When they are away from the primary station then they may, desire to have at least some calls forwarded to a mobile (e.g., cellular or PCS) wireless phone. Changes to a user's profile to accomplish the desired call direction have required manual intervention by the user at the time that they arrive at or depart from the primary workstation. Many users, however, find the required manual intervention to be impractical. Even if profile changes could be set up to occur at specified times of day or days of the week, the profile changes would not accurately reflect the random comings and goings of the user within close proximity of the primary station (e.g., an office worker leaving their office to attend a meeting elsewhere in the building or a doctor leaving their office or a treatment area in a hospital to visit a laboratory or the office of another doctor).

SUMMARY OF THE INVENTION

The present invention has the advantage of automatically determining whether a user is in close proximity to a station and then automatically adopting a profile that properly directs calls according to whether the user is "in-office" or is "away."

In one aspect of the invention, a method is provided for automatically setting call controls corresponding to predetermined profiles of a user in an IP telephony system. The user is associated with a station including a computing device and a fixed telephone outlet. The method includes detecting whether a first short range, mobile transmitter corresponding to the user is within a predetermined distance of the station. It is detected whether a second short range, mobile transmitter corresponding to the user is within a predetermined distance of the station. When only the first transmitter is within the predetermined distance, then a first near-station profile is adopted for the user, wherein the first near-station profile directs calls within the IP telephony system to the fixed telephone outlet. When only the second transmitter is within the predetermined distance, then a second near-station profile is adopted for the user, wherein the second near-station profile directs at least some calls within the IP telephony system to the user via a wireless communication system. When neither of the transmitters are within the predetermined distance, then an away profile is adopted for the user, wherein the away profile directs at least some calls within the IP telephony system to the user via a wireless communication system.

BRIEF DESCRIPTION OF THE DRAWINGS

FIG. 7 is a flowchart of a method used by the IP telephony applications server to select a user profile.

DETAILED DESCRIPTION OF PREFERRED EMBODIMENTS

Figure 1:
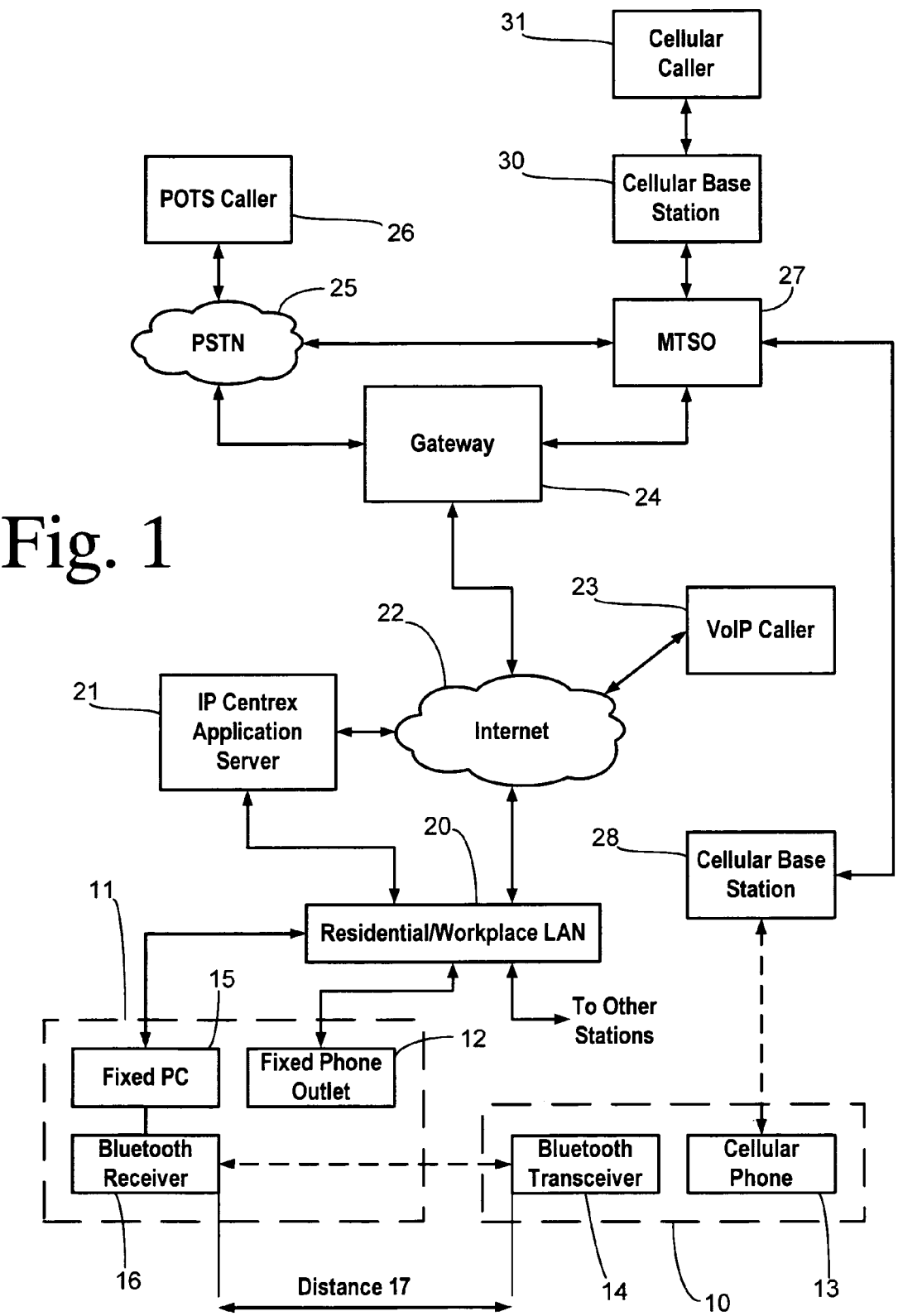
FIG. 1 is a block diagram showing a preferred embodiment of an IP telephony system according to the present invention.

Referring to FIG. 1, a user represented by dashed box 10 is associated with a station 11 which includes a fixed phone outlet 12. Station 11 may include user 10's individual desk in an office or other workplace, or may include any workstation that may be configured to serve as a center of activity for user 10. When user 10 is located at station 11, then it is assumed that user 10 desires to be available for receiving telephone calls. Thus, any telephone calls to user 10 are to be directed to fixed phone outlet 12. When user 10 is not located at station 11, then telephone calls are not directed to fixed phone outlet 12 but are instead directed to voice mail, to a cellular phone 13 carried by user 10, or to another preconfigured telephone number.

For localizing user 10, a short range, mobile transmitter 14 is carried by user 10 which broadcasts a wireless (e.g., radio or infrared) signal that uniquely identifies user 10. Transmitter 14 may include a Bluetooth transceiver incorporated into cellular phone 13 or carried by user 10 as a separate device within an ID badge, for example. The Bluetooth transceiver may incorporate a conventional integrated circuit, such as the UAA3558 Bluetooth RF transceiver integrated circuit manufactured by Philips Semiconductor.

Station 11 includes a fixed personal computer 15 with an integrated receiver 16 for receiving the wireless signal from transmitter 14. Receiver 16 may include a Bluetooth transceiver using the same conventional IC mentioned above. Transmitter 14 and receiver 16 utilize a short range transmission system so that the presence of user 10 is only detected when user 10 is within a predetermined distance 17 of station 11. An infrared system can be used since line of sight is required between the transmitter and receiver. The preferred embodiment utilizes a standard Bluetooth system for providing wireless RF communication at short range. The Bluetooth transmitter and receiver of the invention can be provided using the Bluetooth version of the XyLoc security system available from Ensure Technologies of Ann Arbor, Mich.

The expected range of Bluetooth communications is about 30 feet using a transmission output power of 2.5 mW, which provides an appropriate distance for determining that user 10 is located at or near station 11. The range can be adjusted by increasing or decreasing output power, if desired. User 10 is uniquely identified by Bluetooth transceiver 14 since each transceiver is manufactured with a unique device address derived from the IEEE 802 standard. In addition, the device incorporating the transceiver may be programmed with an additional unique address such as an IP address.

Fixed phone outlet 12 may comprise a hardware IP phone appliance or may be implemented as a software application within fixed PC 15. Phone outlet 12 is coupled to an IP telephony system including a local area network (LAN) 20, an IP Centrex application server 21, and an internetwork 22 such as the Internet. Application server 21 may comprise a Sylantro Applications Switch from Sylantro Systems Corporation of Campbell, Calif., or the BroadWorks hosted PBX application from Broadsoft, Inc. of Gaithersburg, Md. Fixed PC 15 is also coupled to LAN 20 and to IP Centrex application server 21 for providing user location status as described below.

IP telephony calls to and from fixed phone outlet 12 are achieved using conventional protocols and methods, such as the session initiation protocol (SIP), whereby a caller 23 coupled to Internet 22 can conduct a Voice Over IP (VoIP) call with user 10, for example. A gateway 24 is coupled to Internet 22 and to the public switched telephone network (PSTN) 25 for routing telephone calls with a plain old telephone system (POTS) caller 26. A mobile telephone switching office (MTSO) 27 is coupled to cellular base stations 28 and 30 and to gateway 24 for bridging IP telephony calls to a cellular caller 31, for example.

When a call is placed to user 10, a SIP message is transmitted by a VoIP caller 23 or by gateway 24 to IP Centrex application server 21 identifying user 10 as the desired recipient. Server 21 functions as a SIP redirect server and/or a SIP proxy server to route call data according to a profile corresponding to user 10; the profile being automatically updated in response to the presence or non-presence of user 10 at station 11 as described below. Based on the profile, an incoming call might be directed to fixed phone outlet 12, to a voice mail server, or to another telephone number which may include the cellular phone number of cellular phone 13 or a PSTN or other phone number accessible via gateway 24. The action taken may further depend on user-controlled profile variables such as the identity of the caller, the time of the call, or others.

Figure 2:
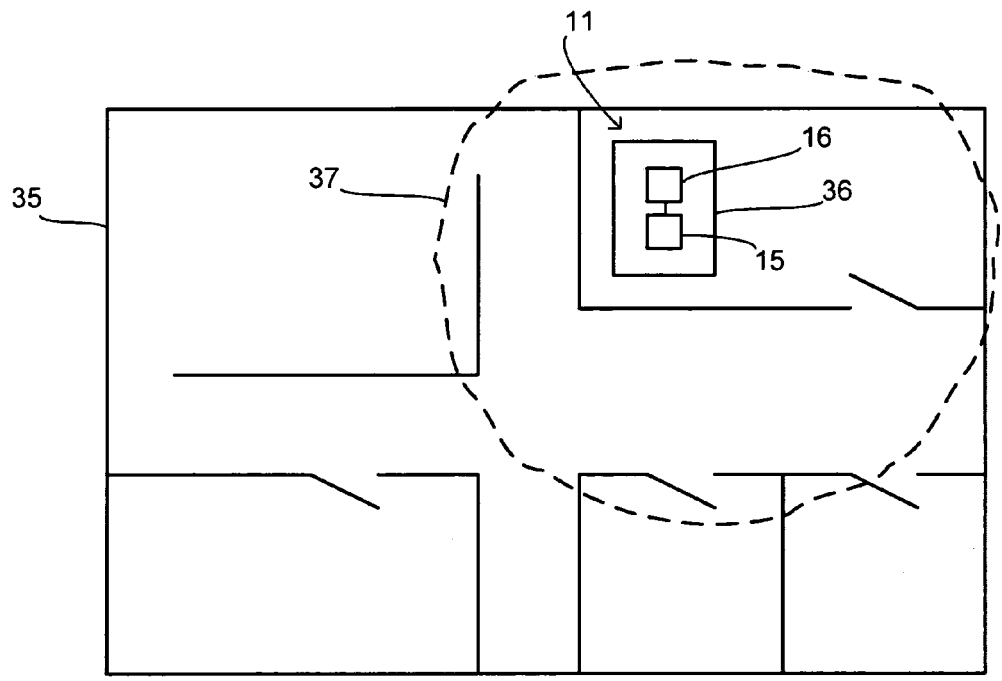
FIG. 2 is a schematic view of an in-office range for automatically determining the presence of a user.

FIG. 2 shows a workstation 11 comprising an individual office in an office suite 35. The user may have a desk 36 upon which resides receiver 16 and computing device 15. Device 15 is coupled via a LAN to the IP Centrex application server (not shown). Receiver 16 is sensitive to a matching transmitter carried by the user being brought within a predetermined detection zone 37. Due to reduced signal propagation through walls and obstructions, zone 37 may have a distorted, noncircular shape.

Figure 3:
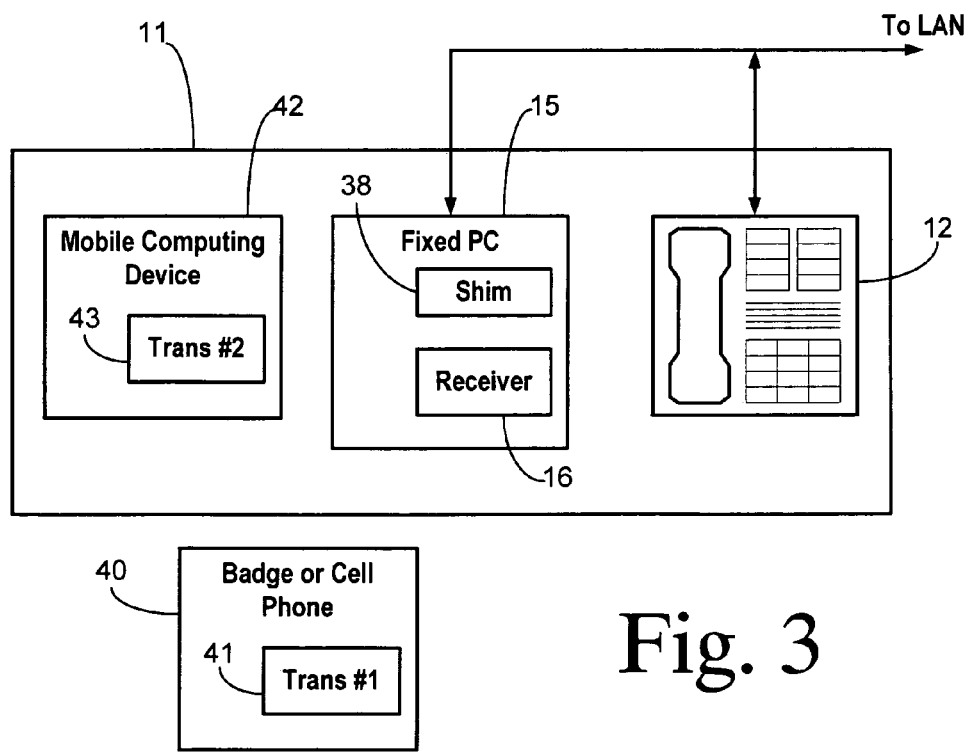
FIG. 3 is a block diagram showing interaction of a user and a mobile computing device with fixed equipment at a primary station.

FIG. 3 shows station 11 in greater detail. Receiver 16 preferably is integrated within fixed computing device 15 (e.g., as a daughter board in a PC). A software application or shim 38 is included in device 15 for performing the functions of interfacing with receiver 16, identifying the user (based on a transmitter device address configured into shim 38), determining the current status of the user (based on interaction with the wireless device or devices carried by the user), and communicating with the IP Centrex application server. The wireless devices include at least a primary device actually carried with the user, such as a badge or cell phone 40 containing a first transmitter 41. The wireless devices may also include a secondary mobile computing device carried with the user when away from primary station 11 (i.e., out of the office) but usually left at their desk when in the office, such as a tablet PC or a personal digital assistant (PDA). For example, FIG. 3 shows a mobile computing device 42 containing a second transmitter 43 within receiving range of receiver 16. In one alternate embodiment of the invention, the in-office status of a user is divided into 1) an in-office/available status when both transmitters 41 and 43 are detected, indicating that the user is at their desk and accepting calls via the fixed phone outlet, and 2) an in-office/unavailable status when only second transmitter 43 is detected, indicating that the user is at work but not right at their desk and that calls should be directed to other than the fixed phone outlet (e.g., to voice mail or to the user's cell phone).

Figure 4:
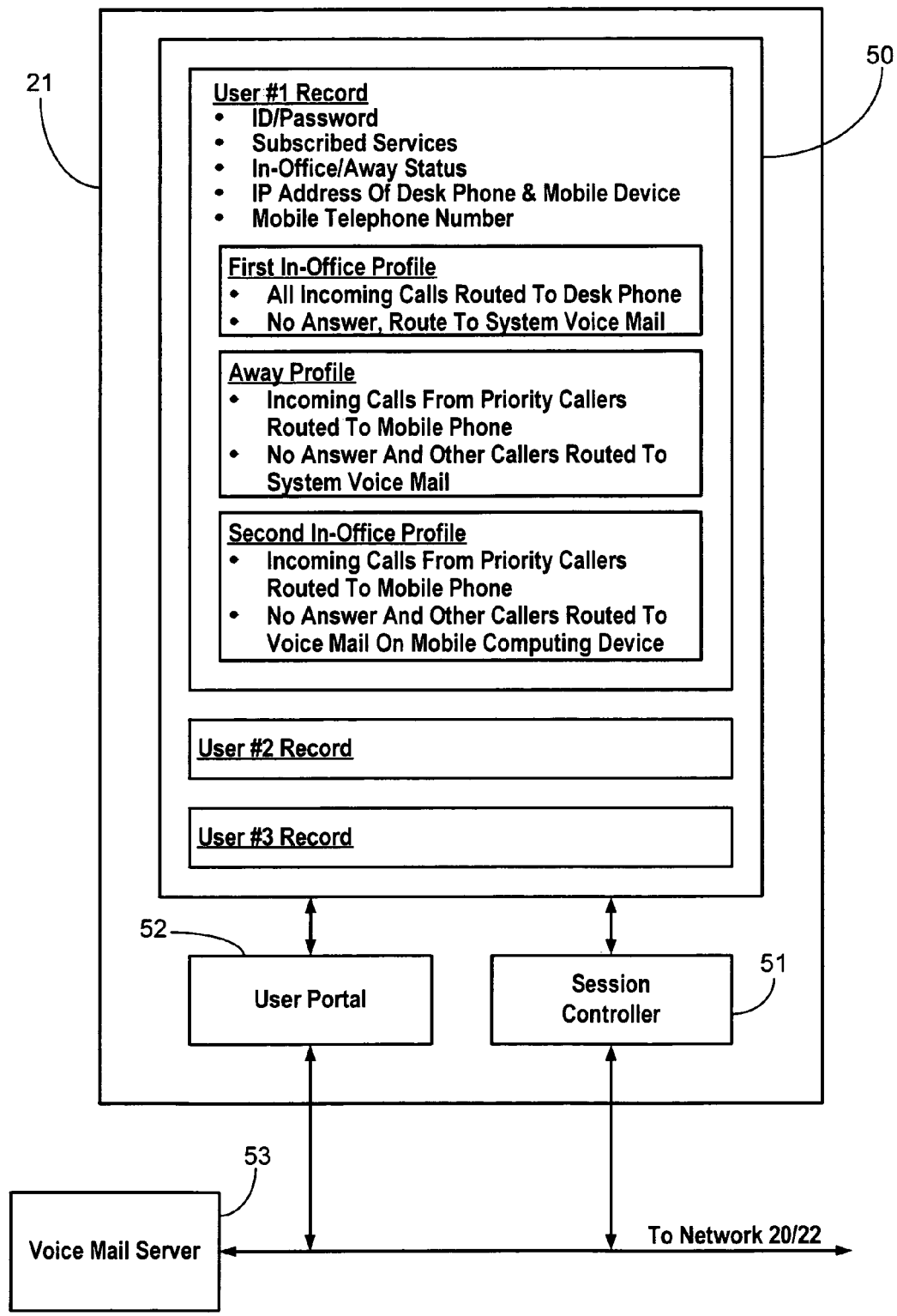
FIG. 4 is a block diagram showing some components of an IP telephony applications server, including a user profile database.

FIG. 4 shows an IP Centrex application server 21 according to one embodiment in greater detail. User profiles are maintained in a profile database 50 which includes records for each respective user of the IP telephony system. Database 50 is coupled to a session controller 51 for using a SIP protocol session to set up call sessions in reliance on the stored profiles. The stored profiles may be accessed and modified by users via a user portal 52 with an appropriate browser. A voice mail server 53 is provided for providing messaging services as known in the art.

Contents of a record for a User #1 are shown in detail. The record identifies the user by a corresponding ID and password. System user information such as subscribed services, IP addresses for the user's desk (i.e., fixed) phone and mobile computing device, and a mobile telephone number of the user are stored. An In-Office/Away Status flag is updated with real time status as will be described below. Each record also includes a plurality of alternative profiles that are configured in advance by the user (or administrator) according to the desired call handling depending upon the In-Office/Away status.

A First In-Office Profile that would be adopted when the user is present at their workstation (e.g., desk) typically includes the direction to route all incoming calls to the user's desk phone. If there is no answer at the desk phone, then calls are to be routed to the voice mail system (typically a voice mail system maintained within the IP telephony system). Alternatively, non-answered calls could be directed to other telephone numbers.

An Away Profile may be adopted when the user is not present at the workstation. In the alternate embodiment including a secondary transmitter on a mobile computing device, both transmitters must be away in order to adopt the Away Profile. In one preferred example of the Away Profile, incoming calls to the user's IP telephony number are redirected to the user's mobile (e.g., cellular) phone if the incoming call is from a priority caller (e.g., family member, boss, secretary). All other callers would be routed to the system voice mail service. If a redirected call is unanswered, then it may again be redirected to the IP Centrex application server and then routed into voice mail.

In the embodiment using a secondary transmitter on a mobile computing device, a Second In-Office Profile is configured by the user for use when the mobile computing device is present at the workstation but the user-carried device is not (i.e., the user is in-office but unavailable). In this example, the Second In-Office Profile directs that incoming calls from priority callers are routed to the user's mobile phone (or other specified telephone number), while all other callers or non-answers are routed to voice mail. If the mobile computing device has the capability, then the voice mail service may be included within the mobile computing device itself. Thus, the user will be able to retrieve messages from the mobile computing device upon their return to the workstation.

Figure 5:
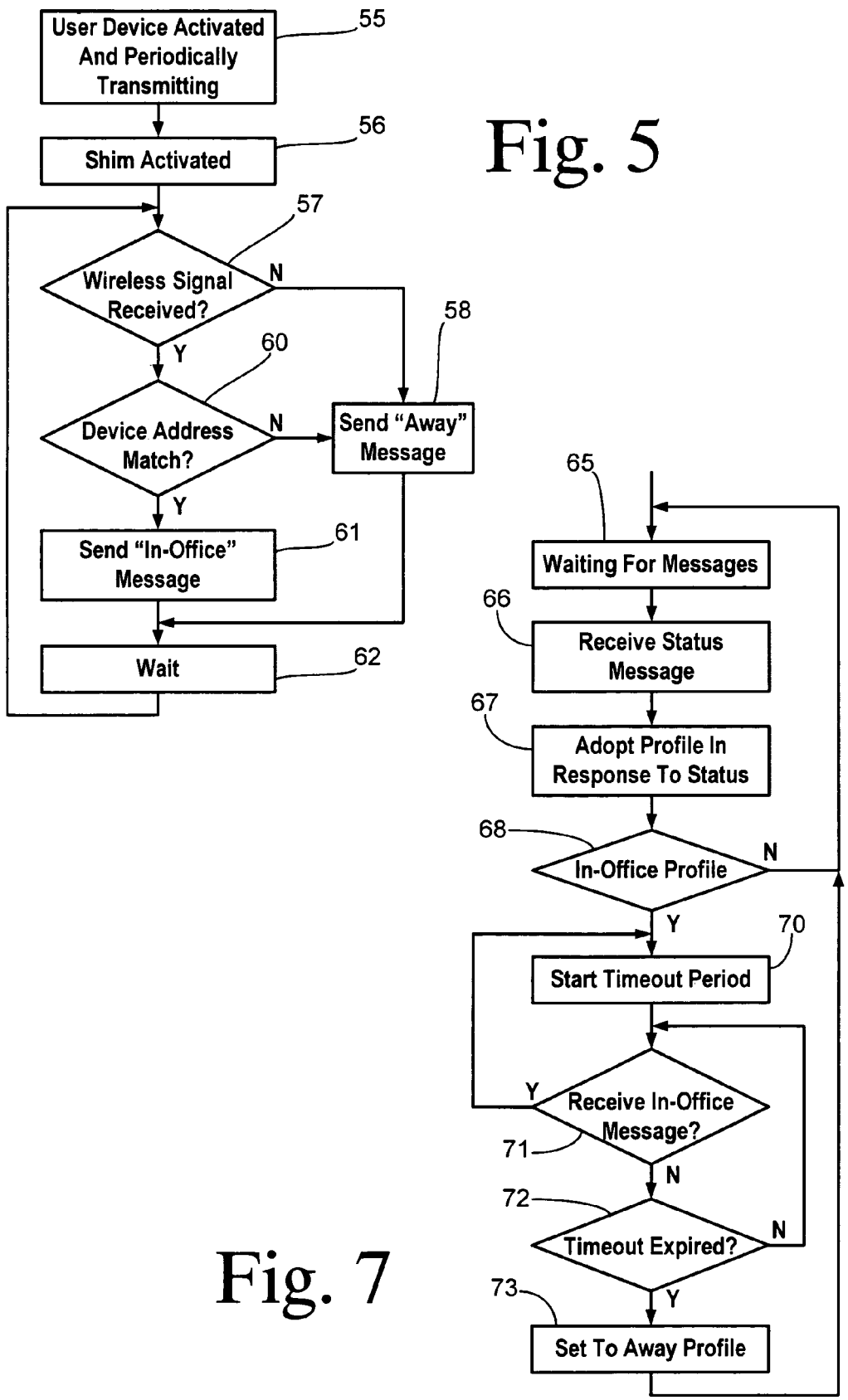
FIG. 5 is a flowchart of a method used by a fixed computing device to detect user presence.

FIG. 5 shows a preferred method for the detection of user presence by the fixed computing device and receiver. In step 55, the user-carried transmitter is activated and periodically transmits a first wireless signal. For example, a Bluetooth device may be programmed to broadcast an inquiry message at a certain repetition rate to check for the presence of other Bluetooth devices. In step 56, the fixed computing device is powered on and the shim is activated. The shim checks whether a wireless signal has been received in step 57. If no wireless signals of the kind broadcast by a user-carried device are present, then an "Away" message is sent in step 58 from the shim to the IP telephony application server. If a wireless signal is received, then a check is made in step 60 to determine whether the address of the detected device matches the device address corresponding to the correct user. For example, Bluetooth transceivers may conduct an inquiry/response exchange for sharing address and other information. If the address information of the carried device does not match the pre-configured address for the user, then the "Away" message is sent in step 58. If the addresses match, then an "In-Office" message is sent in step 62. After waiting an optional delay period in step 62, a return in made to step 57 for further polling for the wireless signal in order to continuously monitor for the presence of the user.

Figure 6:
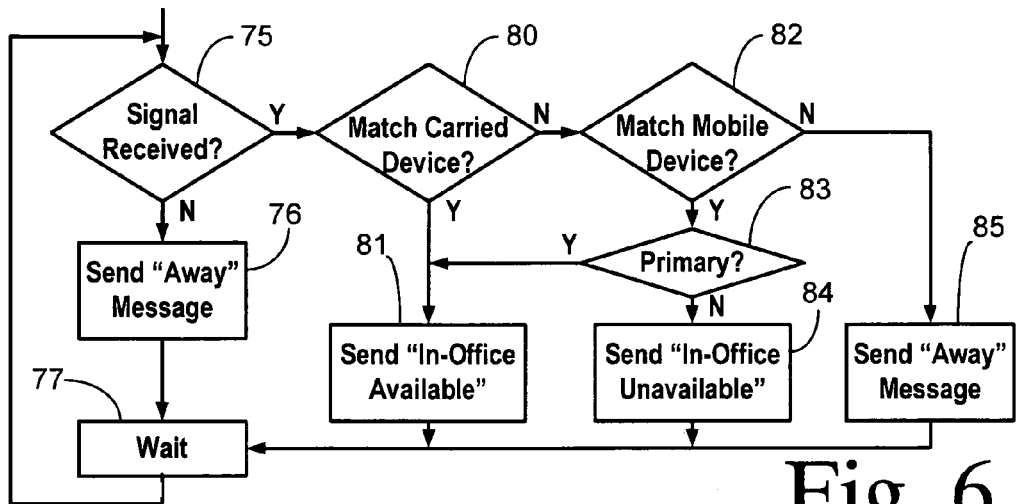
FIG. 6 is a flowchart of a method having an additional type of user status based on presence of a mobile computing device.

FIG. 6 shows an alternative embodiment wherein the presence of a secondary transmitter on a mobile computing device must be detected for adopting the Second In-Office Profile (i.e., when the mobile computing device is present at the workstation but the user carried device is not, indicating that the user is in-office but unavailable). A check is made in step 75 to determine whether a wireless signal is received. If not, then the Away message is sent to the IP Centrex application server in step 76 and the receiver waits for subsequent wireless signals in step 77. If a wireless signal is present, then a check is made in step 80 to determine whether the transmitting device has an address matching the device carried by the user. If yes, then an "In-Office/Available" message is sent in step 81. Otherwise a check is made in step 82 to determine whether the transmitting device has an address matching the mobile computing device or other secondary device of the user. If yes, then a further check is made in step 83 to determine whether the primary (i.e., carried) transmitting device has already been detected. If yes, then the "In-Office/Available" message is sent in step 81. Otherwise, an "In-Office/Unavailable" message is sent in step 84. If the address of the detected device does not match the mobile computing device and if no other primary or secondary transmitters have been detected, then an Away message is sent in step 85.

FIG. 7 shows a method of setting a user status in the IP Centrex applications server in response to the Away and In-Office messages from the shim. In step 65, the application server waits for status messages. After a message is received in step 66, the corresponding profile is adopted in step 67. A check is made in step 68 to determine whether the user status calls for the corresponding "In-Office" profile. If not, then a return is made to step 65.

If the "In-Office" profiled is being used, then a timeout period is started in step 70. A check is made in step 71 to determine whether another "In-Office" message has been received. If yes, then a return is made to step 70 for re-starting the timeout period. If not, then a check is made in step 72 to determine whether the timeout period has expired. If not, then a return is made to step 71 for checking for an "In-Office" message. If the timeout period has expired, then the user status is updated in step 73 to adopt the Away profile. Thus, if the shim becomes inactive (e.g., user's PC is powered off), then it will be assumed that the user has left the workstation after the timeout period.

Figure 8:
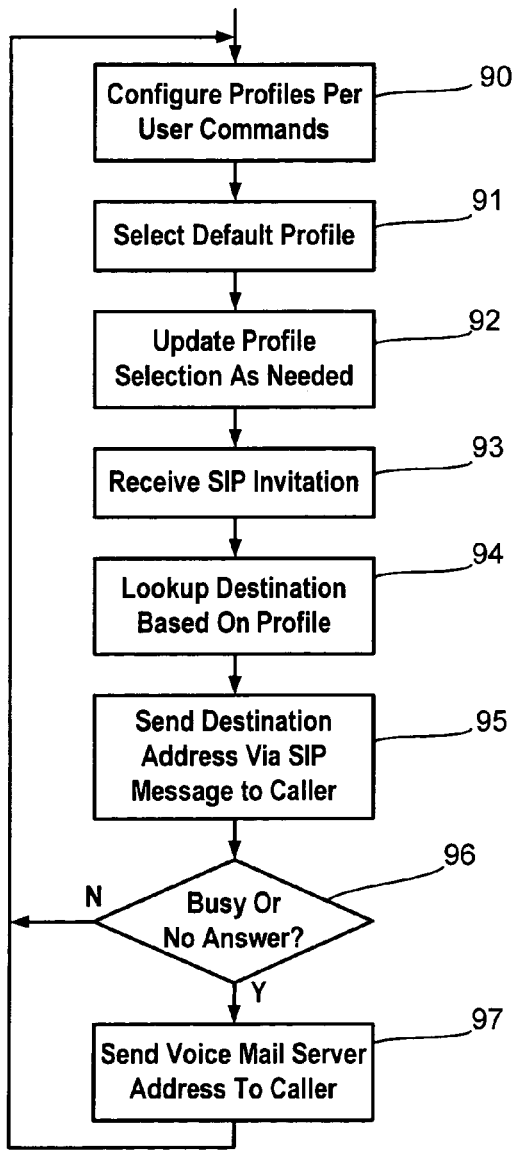
FIG. 8 is a flowchart of a method for processing an incoming call to the user.

FIG. 8 shows a method for selecting a profile and directing incoming call requests by the IP Centrex application server. In step 90, the server accepts user commands for configuring their respective profiles (e.g., via a web portal). A default profile is selected in step 91, typically comprising the Away Profile so that an In-Office profile is not selected until the user is positively confirmed by the invention to be present at their primary station. In step 92, shim messages are received and the active profile for a user is updated as necessary. For example, in response to an In-Office/Available message, the First In-Office Profile is selected. In response to an In-Office/Unavailable message, the Second In-Office Profile is selected. In response to an Away message or after expiration of the timeout period, the Away Profile is selected.

A SIP-invite message is received in step 93 when a third party is initiating an attempt to call the user. The server looks up the appropriate destination in step 94 based on the active profile. In step 95, the server sends the destination address (e.g., the IP address of the fixed phone outlet, the IP address of a voice mail server, or a redirect number to the user's cellular phone depending upon the profile) to the caller via a SIP response message. The server waits in step 96 to determine whether the caller sends another message indicating that the user was busy or did not answer. If so, then a SIP message is sent with the IP address of a voice mail server in step 97. Otherwise, the server continues operation as described above.

The disclosed embodiment is only one example of an IP telephony system that may benefit from the present invention. Although an IP Centrex system has been shown, other systems such as an IP PBX or any other system using a profile to direct calls could be used. The profile actions shown illustrate some of the ways that a user may wish to direct calls in the example conditions shown, but many other actions or call destinations could also be used.

What is claimed is:

1. A method of automatically setting call controls corresponding to predetermined profiles of a user in an IP telephony system, said user being associated with a station including a computing device and a fixed telephone outlet, said method comprising the steps of:
   detecting whether a first short range, mobile transmitter corresponding to said user is within a predetermined distance of said station;
   detecting whether a second short range, mobile transmitter corresponding to said user is within a predetermined distance of said station;
   when only said first transmitter is within said predetermined distance, then adopting a first near-station profile for said user, wherein said first near-station profile directs calls within said IP telephony system to said fixed telephone outlet;
   when only said second transmitter is within said predetermined distance, then adopting a second near-station profile for said user, wherein said second near-station profile directs at least some calls within said IP telephony system to said user via a wireless communication system; and
   when neither of said transmitters are within said predetermined distance, then adopting an away profile for said user, wherein said away profile directs at least some calls within said IP telephony system to said user via a wireless communication system.

2. The method of claim 1 wherein said first transmitter is carried by and identifies a location of said user, wherein said second transmitter is integrated with a mobile computing device, and wherein said second near-station profile directs at least some calls within said IP telephony system to a voice mail processor which includes said mobile computing device.

3. The method of claim 2 wherein said first transmitter is integrated with a personal cellular transceiver operating within said wireless communication system.

4. The method of claim 1 wherein said first and second transmitters are each comprised of a respective Bluetooth transceiver and wherein said computing device comprises at least a Bluetooth receiver for detecting Bluetooth signals from said first and second transmitters.

5. A method of operating an IP telephony application server as part of a telephony system providing service to a user via a respective fixed station and a respective mobile transceiver, wherein said fixed station includes a fixed computing device and a fixed telephone outlet, said method comprising the steps of:
   configuring a near-station profile for said user;
   configuring an away profile for said user;
   receiving a first automatically-generated signal from said fixed computing device indicating that said user is within a predetermined distance of said fixed station;
   adopting said near-station profile in response to said automatically-generated signal so that calls for said user are directed to said fixed telephone outlet; and
   adopting said away profile if said first automatically-generated signal is not received for a predetermined timeout period so that at least some calls for said user are directed to said mobile transceiver.

6. The method of claim 5 further comprising the steps of:
   receiving a second automatically-generated signal from said fixed computing device indicating that said user is not within said predetermined distance of said fixed station; and
   adopting said away profile in response to said second automatically-generated signal so that at least some calls for said user are directed to said mobile transceiver.

7. The method of claim 5 further comprising the steps of:
   configuring a second near-station profile for said user, said second near-station profile being associated with a mobile computing device of said user;
   receiving a third automatically-generated signal from said fixed computing device indicating that said user is not within said predetermined distance of said fixed station and that said mobile computing device is within said predetermined distance of said fixed station; and
   adopting said second near-station profile in response to said third automatically-generated signal so that at least some calls for said user are directed to said mobile computing device for providing a voice mail service.

* * * * *